J. A. SCHARWATH.
INSULATING CONDUIT.
APPLICATION FILED JAN. 15, 1918.
1,351,133.
Patented Aug. 31, 1920.
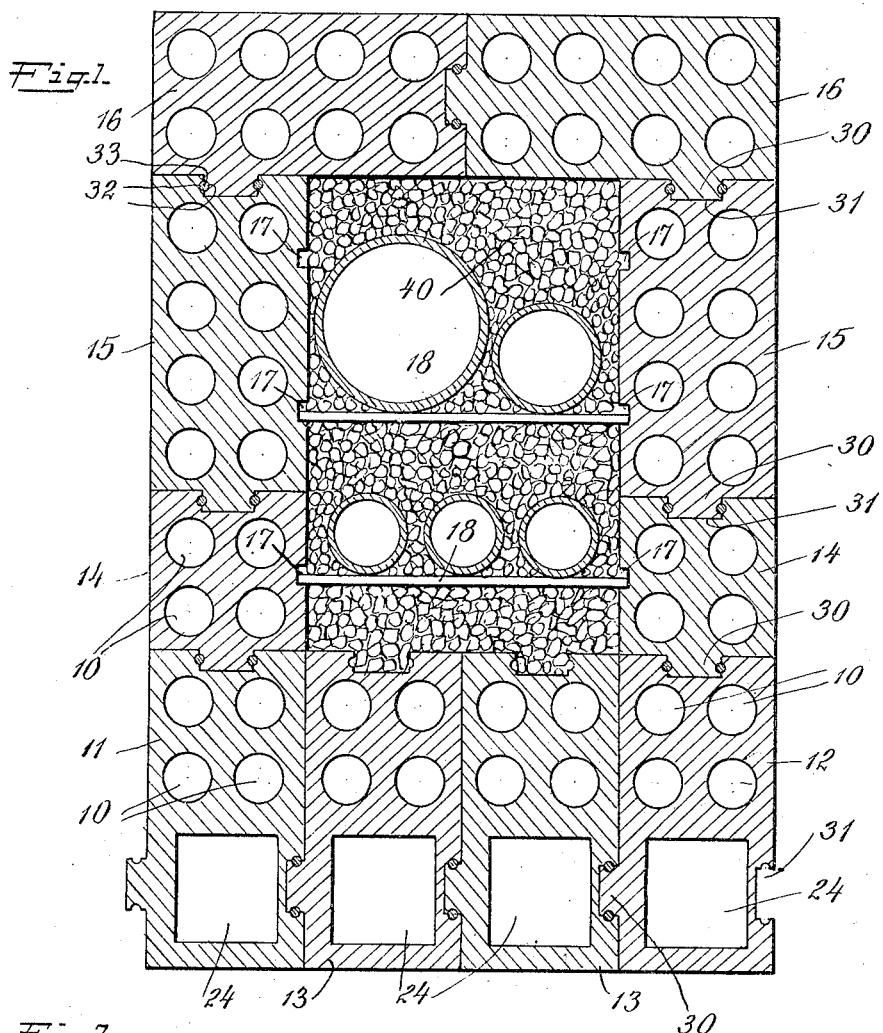
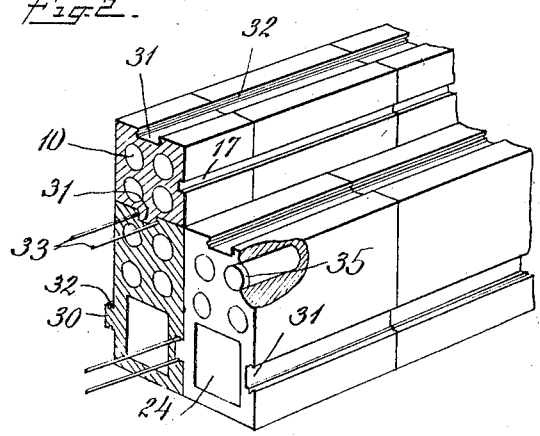
INVENTOR
John A. Scharwath
BY
Marshall A. Dearborn
ATTORNEYS

UNITED STATES PATENT OFFICE.

JOHN A. SCHARWATH, OF ELIZABETH, NEW JERSEY.

INSULATING-CONDUIT.

1,351,133.  Specification of Letters Patent.  Patented Aug. 31, 1920.

Original application filed January 15, 1916, Serial No. 72,197. Divided and this application filed January 15, 1918. Serial No. 211,920.

*To all whom it may concern:*

Be it known that I, JOHN A. SCHARWATH, a citizen of the United States of America, and a resident of Elizabeth, Union county, and State of New Jersey, United States of America, have invented certain new and useful Improvements in Insulating-Conduits, of which the following is a specification, reference being had to the accompanying drawings, forming a part thereof.

My invention relates to structures for insulating against the transfer of heat and has especial reference to a conduit or similar structure for the protection of steam and hot water pipes, or of pipes containing refrigerating liquids against the transfer of heat from or to the pipes.

This application is in part a division and in part a continuation of my copending application Serial No. 72,197 filed January 15, 1916.

One object of my invention is to provide a building unit or tile that shall be particularly well adapted for use in constructing conduits for steam pipes and the like, or refrigerating pipes, and also for the construction of walls or partitions for heated or refrigerated chambers, or for general use in buildings or dwellings.

Another object is to provide a simple and durable conduit structure that shall practically avoid loss of heat by radiation and prevent circulation of air and that shall be impervious to moisture.

Another object is to provide a building unit for conduits that shall comprise simple and effective means for supporting one or more transverse rods or carriers on which pipes or other transmission members may be mounted within the conduit.

Other objects and advantages of my invention will be set forth hereinafter, and in order that my invention may be thoroughly understood I will now proceed to describe the same in the following specification, and then point out the novel features thereof in appended claims.

Referring to the drawings:

Figure 1 is an elevation of a section of conduit arranged and constructed in accordance with my invention.

Fig. 2 is a perspective view of one of the building units employed in the conduits of Fig. 1 and which in itself constitutes a part of my invention.

The conduit illustrated is particularly adapted for use under ground, to provide a protective casing for pipes transmitting steam, hot water, or refrigerated liquids, or in fact any fluid which it is desired to maintain at a temperature either greater or less than the temperature of the surrounding earth.

While I have shown a conduit of substantially square section, my invention is by no means restricted to the form of conduit and the building units of my invention may be utilized for producing conduits of circular, semi-circular, hexagonal, or other desired forms.

As clearly shown in the drawings, the conduit is built up of hollow brick or tiles which extend longitudinally and have a plurality of longitudinally extending holes designated by 10. The holes are preferably cylindrical in form and materially improve the insulating effectiveness of the block without weakening it to any material extend. At the bottom of the conduit there are corner bricks 11 and 12 and intermediate bricks 13. The number of intermediate bricks will of course depend on the size of the conduit. The side walls include the corner bricks 11 and 12, intermediate bricks 14 and 15 mounted thereon, and top corner bricks 16. The bricks 16 are of sufficient size to extend across the top of the conduit.

The bricks 14 are half-size and are provided with grooves or notches 17 in one side. They are assembled with the grooves inside the conduit so that they form pockets providing shoulders on which transverse supporting rods 18 are mounted.

The bricks 15 are provided with two grooves 17 which are spaced apart and are also located in the conduit. The pipe supporting rods are mounted in any or all of the notches 17.

It will be observed that the conduit and insulating materials of my invention are particularly arranged and adapted for the protection of steam pipes and the like, since special provision is made in every case against the corroding influence of moisture.

The bricks have interlocking projections and grooves 30 and 31 which coöperate loosely so as to permit cement or any moisture-proof seal to be introduced or attached while they are being laid in position. The sides of the projections and grooves are provided with keyways 32 which are adapted to receive keys, such as iron or steel rods 33. These rods are removable, are of considerable length, and when in place they prevent the separation of the bricks and materially reinforce and strengthen the structure.

I prefer to utilize within the conduit directly surrounding the steam pipes, for example, a quantity of small insulating bodies 40, which may correspond in size to pea coal, each body consisting of a small piece of cork of irregular shape having an envelop or coating of concrete and plaster for example, and by reason of this heat protective coating the cork is enabled to resist relatively high temperatures even though the thickness of the envelop or coating is comparatively small,—$\frac{1}{16}''$ for example. These coated bodies which have the appearance of small pebbles are filled into the space in the conduit around the pipes. This insulating mass forms the subject matter of my copending application Serial No. 72,197, of which this application is in part a division and in part a continuation.

In order to preclude the possibility of a circulation of air through the conduit and to confine the insulating filling material which surrounds the piping within the conduit, I prefer to provide at building entrances, manholes, pits, etc., a shutter which is not affected by heat or moisture and may for example, be formed of vitrified asbestos board 35 closing the ends of the holes 10.

In building up the conduit, the bricks or tile are preferably arranged to break joints longitudinally and are laid in cement, mortar, or other form of water repelling seal or bond, like bricks in a wall, the end joints however, of drainage chambers 24 not being sealed so as to provide for the free entrance of water into same.

The conduit may be enlarged laterally to provide additional space for a valve, or to provide anchorage pits, manholes or the like.

The tiles may be formed of any suitable substance such as cement, clay, plaster or metal, and if desired, any or all outer surfaces of the tile may be coated with bituminous or other water repellant material. The keys or rods 33 are made removable so that by pulling them out some of the bricks or tiles may be removed for the purpose of giving access to the central chamber in which the pipes are placed.

By not closing or sealing the ends of a series of the openings 10 an auxiliary conduit for wires, small pipes and the like may be provided.

What I claim is:

1. In a structure of the character described, bricks or blocks having interfitting tongues and grooves and provided with coöperating opposed key slots in the sides of said tongues and grooves and rods or keys engaged in said coöperating key slots and removable therefrom for the purpose of enabling separation of the bricks or blocks thus keyed together.

2. A conduit of the character described comprising bricks or blocks having tongue and groove joints provided by grooves formed in the blocks consisting each of a groove formed in one block and a single projecting tongue on the adjoining block and seating in such groove, the side walls of said tongues and grooves having opposed coöperating key slots therein and removable rods or keys engaged in said coöperating key slots and withdrawable therefrom.

3. In a conduit, the combination of opposite side bricks having grooves and a rod adapted to coöperate with the grooves, and providing a transverse carrier in the conduit.

4. In a conduit, the combination of a plurality of bricks constituting opposite side walls and having longitudinal shoulders integral therewith for adjustably supporting a transverse pipe carrier at its ends.

5. In a conduit, the combination of a plurality of bricks constituting opposite side walls and having longitudinal grooves formed therein, and transverse rods spaced longitudinally of the conduit and each mounted therein with its ends extending into a pair of opposite grooves.

6. A conduit for steam pipes or the like comprising hollow bricks having coöperating projections or grooves, coöperating key slots in the sides of the projections and grooves, and removable rods or keys in the key slots for locking the bricks together, the bricks which constitute the opposite side walls of the conduit having longitudinal shoulders integral therewith for adjustably supporting the ends of a transverse pipe carrier.

7. An insulating structure comprising bricks or blocks assembled to form and surround a conduit, said bricks having longitudinal tongue and groove joints and key slots in the sides of the tongues and grooves, and removable rods or keys in the key slots extending longitudinally of the structure for considerable distances for locking the bricks or blocks together and reinforcing the structure, the bricks which constitute opposite side walls of the conduit having longitudinal grooves formed therein and transverse rods spaced longitudinally of the conduit and each mounted therein with its ends extending into a pair of opposite grooves.

In witness whereof, I have hereunto set my hand this 10 day of Jan., 1918.

JOHN A. SCHARWATH.